Oct. 30, 1928.
R. W. KNAPP
RAT OR MOUSE TRAP
Filed May 13, 1927
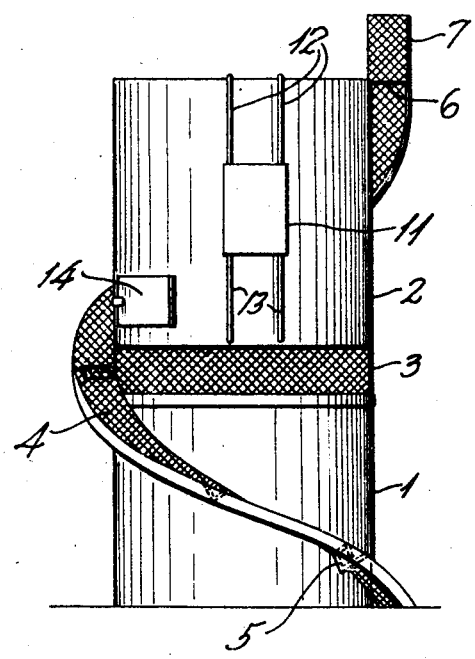
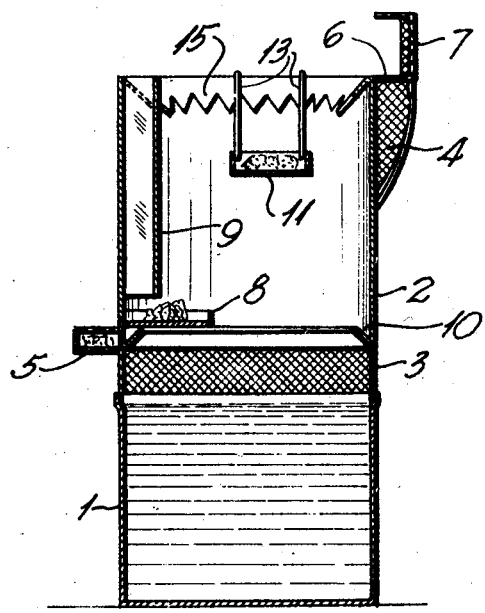
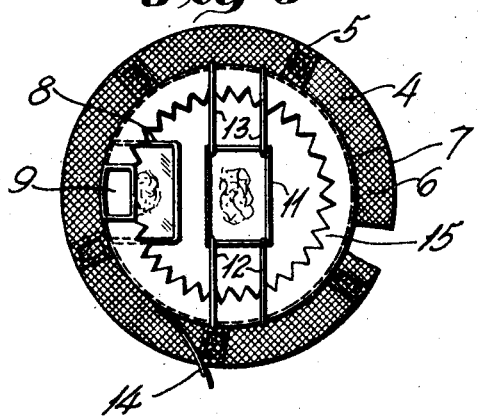
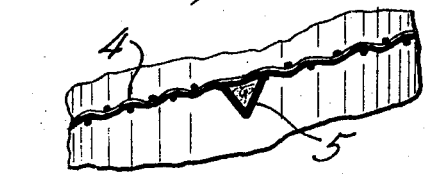
Inventor
Robert Wesley Knapp
By Adam E. Fisher
Attorney Patented Oct. 30, 1928.

1,689,529

UNITED STATES PATENT OFFICE.

ROBERT WESLEY KNAPP, OF CHESTER, ILLINOIS.

RAT OR MOUSE TRAP.

Application filed May 13, 1927. Serial No. 190,981.

My invention relates to rat or mouse traps, and has for one object to provide such a trap having no moving parts when in operation.

Another object is to provide such a trap adapted to be rendered temporarily inoperative in order to familiarize the rodents with the device, so as to the more readily enter into the trap.

Another object is to provide such a trap which shall be adapted to drown the rodents when caught therein.

With the above and other objects in view, my invention consists in the combination and arrangement of parts hereinafter described and claimed, and more particularly illustrated in its preferred embodiment in the accompanying drawings, wherein, Figure 1 is a side view of the trap.

Figure 2 is a side sectional view of Figure 1, but showing the hinged feed table set in the trap.

Figure 3 is a plan view of Figure 1, but showing the hinged feed table set in the trap, and the door to the feed pan opened, in order to familiarize the rodents with the device.

Figure 4 is a detail of one of the trough shaped brackets.

Figure 5 is a detail of the feed table.

Referring now more particularly to the drawings, I provide a cylindrical water tight receptacle or container 1, of a depth sufficient to drown a rodent when the receptacle is filled with water; an upstanding metal cylinder 2 is positioned above said receptacle 1 and spaced therefrom as by a reticulated cylinder 3. The cylinders 2 and 3 constitute vertically aligned extensions of the cylindrical receptacle 1. A spiral reticulated incline 4 extends along the outside of and from the bottom of the receptacle 1 to the top of the cylinder 2, and is supported therefrom by trough shaped brackets 5. The said incline 4 terminates at its upper end in a feed platform 6, said platform 6 being surrounded by a reticulated housing 7, the sides adjacent to the said incline and the said cylinder being left open. Oppositely from the said platform, and immediately above the reticulated cylinder 3 and mounted on the inside of the cylinder 2 is a feed pan 8, and a chute 9 extends vertically from said feed pan to the upper edge of the cylinder 2. An annular trough 10 extends around the inside of the cylinder 2 adjacent to the reticulated cylinder 3. A feed table 11 has one end hinged as by hangers 12 to one side of the upper edge of the cylinder 2, and the other end of the feed table is supported from the other side of the upper edge of the cylinder 2 as by hooked hangers 13. A door 14 is hinged to the cylinder 2 adjacent to the feed pan 8, and is adapted to form a passage directly from the incline 4 to the feed pan 8. A serrated collar 15 is mounted interiorly of the cylinder 2 and immediately below the upper edge thereof.

In use, the trap is arranged as shown in Figure 3, with the door 14 opened so that the rodent may gain access directly to the feed pan 8. Suitable bait is placed on the feed pan 8 as by dropping the bait through the chute 9. Suitable bait is also placed in the trough shaped brackets 5, so as to attract the rodent and lead it on up the incline to the door. After the rodents have become accustomed to the device, the door 14 is closed, and the rodents attracted to the top of the incline by means of bait placed on the platform 6. At first the feed table 11 is placed inside the trap as shown in Figure 3, in order to attract the rodents into the trap, suitable bait being placed on the table for this purpose. The rodents will thus be enticed to enter the trap to secure the bait on the table and on the feed pan, but of course a ready means of egress from the trap exists by way of the feed table. After the rodents have thus become thoroughly accustomed to the trap, the feed table 11 is taken out of the trap, as shown in Figure 1, the annular trough 10 is filled with bait, and the trap is now set to catch the rodents. The rodents will now jump from the platform 6 to the feed pan 8, but their egress is blocked by the serrated collar 15, and they cannot jump back onto the platform. The rodents are attracted along the trough 10, climbing around the inside of the reticulated cylinder 3 until exhausted, when they will fall in the receptacle 1. If the receptacle 1 is filled with water, the rodents will be drowned therein, however, if desired, the receptacle may be left dry and other means employed for disposing of the rodents.

I claim:

1. A trap including a receptacle and an extension to the receptacle, a portion of said extension having reticulations, an annular trough positioned interiorly of said extension adjacent to said reticulations, and a reticulated incline extending around the outside of said trap and from the bottom of said receptacle to the top of said extension.

2. A trap including a receptacle and a vertical extension to the receptacle, a portion of said extension having reticulations, an annular trough positioned interiorly of said extension adjacent to said reticulations, a serrated collar positioned interiorly of said extension adjacent to the upper edge thereof, a reticulated incline extending around the outside of said trap and from the bottom of said receptacle to the top of said extension, and trough shaped brackets positioned outwardly of and on said trap and supporting said incline.

3. A trap including a receptacle and a vertical extension to the receptacle, a portion of said extension having reticulations, an annular trough positioned interiorly of said extension adjacent to said reticulations, a serrated collar positioned interiorly of said extension adjacent to the upper edge thereof, a reticulated incline extending around the outside of said trap and from the bottom of said receptacle to the top of said extension, trough shaped brackets positioned outwardly of and on said trap and supporting said incline, said incline terminating in a platform, a reticulated housing on said platform, said housing having open sides facing said incline and said extension, a feed pan positioned interiorly of said extension oppositely of said platform and adjacent to said reticulations, said extension having an aperture adjacent said feed pan, a door hinged to said extension and adapted to close said aperture, a feed table having one end hinged to one side of the upper portion of said extension and the other end adapted to releasably engage the other side of the upper portion of said extension and a feed duct extending vertically from said feed pan interiorly of said extension.

4. A trap for rodents comprising a relatively deep receptacle, the medial portion of said receptacle having a reticulated annulus, an annular trough positioned interiorly of said receptacle adjacent to said annulus, a feed pan positioned interiorly of said receptacle adjacent to said trough, a platform mounted on said receptacle at the upper edge thereof and oppositely of said feed pan, a reticulated incline mounted outwardly of said receptacle and extending around the periphery and from the bottom thereof, said incline terminating at said platform, and trough shaped brackets extending outwardly of said receptacle and supporting said incline.

In testimony whereof I affix my signature.

ROBERT WESLEY KNAPP.